US010088675B1

(12) United States Patent
Brown et al.

(10) Patent No.: US 10,088,675 B1
(45) Date of Patent: Oct. 2, 2018

(54) TURNING LIGHT PIPE FOR A PUPIL EXPANSION SYSTEM AND METHOD

(71) Applicants: Robert D. Brown, Lake Oswego, OR (US); James H. Stanley, Palo Alto, CA (US); Eric P. Stratton, Portland, OR (US); Ming Yu, Beaverton, OR (US)

(72) Inventors: Robert D. Brown, Lake Oswego, OR (US); James H. Stanley, Palo Alto, CA (US); Eric P. Stratton, Portland, OR (US); Ming Yu, Beaverton, OR (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 113 days.

(21) Appl. No.: 14/715,332

(22) Filed: May 18, 2015

(51) Int. Cl.
*G03H 1/00* (2006.01)
*G02B 5/32* (2006.01)
*G02B 27/00* (2006.01)
*F21V 8/00* (2006.01)
*G02B 27/30* (2006.01)
(Continued)

(52) U.S. Cl.
CPC ........... *G02B 27/0081* (2013.01); *G02B 5/32* (2013.01); *G02B 6/0016* (2013.01); *G02B 6/0036* (2013.01); *G02B 17/0884* (2013.01); *G02B 27/0103* (2013.01); *G02B 27/30* (2013.01); *G02B 2027/0123* (2013.01)

(58) Field of Classification Search
CPC ................. G02B 5/32; G02B 27/0172; G02B 2027/0174; G02B 27/0103; G02B 2027/0178; G02B 27/01; G02B 27/0101; G02B 6/00; G02B 6/0016; G02B 2027/0105; G02B 6/0033; G02B 6/0045; G02B 6/0046; G03H 2223/16

USPC .......................................... 359/13, 34, 35, 15
See application file for complete search history.

(56) References Cited

U.S. PATENT DOCUMENTS

| 2,141,884 | A | 12/1938 | Sonnefeld |
| 3,620,601 | A | 11/1971 | Waghorn |

(Continued)

FOREIGN PATENT DOCUMENTS

| CN | 200944140 Y | 9/2007 |
| CN | 101881936 A | 11/2010 |

(Continued)

OTHER PUBLICATIONS

Final Office Action on U.S. Appl. No. 13/250,858, dated Jul. 11, 2016, 21 pages.

(Continued)

*Primary Examiner* — Jade R Chwasz
(74) *Attorney, Agent, or Firm* — Donna P. Suchy; Daniel M. Barbieri (57) ABSTRACT

A display system includes a light pipe including elongated surfaces and an input coupler. The light pipe is configured to provide an image received by the input coupler and expand the image in a first direction through one of the elongated surfaces. The display also includes a waveguide including an output grating, a first surface, a second surface, and a side surface. The first surface and the second surface have a larger area than the side surface, the output grating being configured to provide the image expanded in a second direction. The second direction is different than the first direction. The image enters the waveguide from the one of the elongated surfaces at the side surface.

20 Claims, 5 Drawing Sheets

(51) Int. Cl.
*G02B 17/08* (2006.01)
*G02B 27/01* (2006.01)

(56) References Cited

U.S. PATENT DOCUMENTS

| | | |
|---|---|---|
| 3,851,303 A | 11/1974 | Muller |
| 3,885,095 A | 5/1975 | Wolfson et al. |
| 3,940,204 A | 2/1976 | Withrington |
| 4,082,432 A | 4/1978 | Kirschner |
| 4,099,841 A | 7/1978 | Ellis |
| 4,178,074 A | 12/1979 | Heller |
| 4,218,111 A | 8/1980 | Withrington et al. |
| 4,232,943 A | 11/1980 | Rogers |
| 4,309,070 A | 1/1982 | St Leger Searle |
| 4,647,967 A | 3/1987 | Kirschner et al. |
| 4,711,512 A | 12/1987 | Upatnieks |
| 4,714,320 A | 12/1987 | Banbury |
| 4,743,083 A | 5/1988 | Schimpe |
| 4,749,256 A | 6/1988 | Bell et al. |
| 4,775,218 A | 10/1988 | Wood et al. |
| 4,799,765 A | 1/1989 | Ferrer |
| 4,854,688 A | 8/1989 | Hayford et al. |
| 4,928,301 A | 5/1990 | Smoot |
| 4,946,245 A | 8/1990 | Chamberlin et al. |
| 5,007,711 A | 4/1991 | Wood et al. |
| 5,035,734 A | 7/1991 | Honkanen et al. |
| 5,076,664 A | 12/1991 | Migozzi |
| 5,079,416 A | 1/1992 | Filipovich |
| 5,117,285 A | 5/1992 | Nelson et al. |
| 5,124,821 A | 6/1992 | Antier et al. |
| 5,148,302 A | 9/1992 | Nagano et al. |
| 5,151,958 A | 9/1992 | Honkanen |
| 5,153,751 A | 10/1992 | Ishikawa et al. |
| 5,159,445 A | 10/1992 | Gitlin et al. |
| 5,160,523 A | 11/1992 | Honkanen et al. |
| 5,183,545 A | 2/1993 | Branca et al. |
| 5,187,597 A | 2/1993 | Kato et al. |
| 5,210,624 A | 5/1993 | Matsumoto et al. |
| 5,218,360 A | 6/1993 | Goetz et al. |
| 5,243,413 A | 9/1993 | Gitlin et al. |
| 5,289,315 A | 2/1994 | Makita et al. |
| 5,295,208 A | 3/1994 | Caulfield et al. |
| 5,303,085 A | 4/1994 | Rallison |
| 5,317,405 A | 5/1994 | Kuriki et al. |
| 5,341,230 A | 8/1994 | Smith |
| 5,359,362 A | 10/1994 | Lewis et al. |
| 5,363,220 A | 11/1994 | Kuwayama et al. |
| 5,369,511 A | 11/1994 | Amos |
| 5,400,069 A | 3/1995 | Braun et al. |
| 5,408,346 A | 4/1995 | Trissel et al. |
| 5,418,584 A | 5/1995 | Larson |
| 5,438,357 A | 8/1995 | McNelley |
| 5,455,693 A | 10/1995 | Wreede et al. |
| 5,471,326 A | 11/1995 | Hall et al. |
| 5,473,222 A | 12/1995 | Thoeny et al. |
| 5,496,621 A | 3/1996 | Makita et al. |
| 5,500,671 A | 3/1996 | Andersson et al. |
| 5,510,913 A | 4/1996 | Hashimoto et al. |
| 5,515,184 A | 5/1996 | Caulfield et al. |
| 5,524,272 A | 6/1996 | Podowski et al. |
| 5,532,736 A | 7/1996 | Kuriki et al. |
| 5,537,232 A | 7/1996 | Biles |
| 5,572,248 A | 11/1996 | Allen et al. |
| 5,579,026 A | 11/1996 | Tabata |
| 5,583,795 A | 12/1996 | Smyth |
| 5,604,611 A | 2/1997 | Saburi et al. |
| 5,606,433 A | 2/1997 | Yin et al. |
| 5,612,733 A | 3/1997 | Flohr |
| 5,612,734 A | 3/1997 | Nelson et al. |
| 5,619,254 A | 4/1997 | McNelley |
| 5,629,259 A | 5/1997 | Akada et al. |
| 5,631,107 A | 5/1997 | Tarumi et al. |
| 5,633,100 A | 5/1997 | Mickish et al. |
| 5,646,785 A | 7/1997 | Gilboa et al. |
| 5,648,857 A | 7/1997 | Ando et al. |
| 5,661,577 A | 8/1997 | Jenkins et al. |
| 5,661,603 A | 8/1997 | Hanano et al. |
| 5,665,494 A | 9/1997 | Kawabata et al. |
| 5,668,907 A | 9/1997 | Veligdan |
| 5,682,255 A | 10/1997 | Friesem et al. |
| 5,694,230 A | 12/1997 | Welch |
| 5,701,132 A | 12/1997 | Kollin et al. |
| 5,706,108 A | 1/1998 | Ando et al. |
| 5,707,925 A | 1/1998 | Akada et al. |
| 5,724,189 A | 3/1998 | Ferrante |
| 5,726,782 A | 3/1998 | Kato et al. |
| 5,727,098 A | 3/1998 | Jacobson |
| 5,729,242 A | 3/1998 | Margerum et al. |
| 5,731,060 A | 3/1998 | Hirukawa et al. |
| 5,731,853 A | 3/1998 | Taketomi et al. |
| 5,742,262 A | 4/1998 | Tabata et al. |
| 5,751,452 A | 5/1998 | Tanaka et al. |
| 5,760,931 A | 6/1998 | Saburi et al. |
| 5,764,414 A | 6/1998 | King et al. |
| 5,790,288 A | 8/1998 | Jager et al. |
| 5,812,608 A | 9/1998 | Valimaki et al. |
| 5,822,127 A | 10/1998 | Chen et al. |
| 5,841,507 A | 11/1998 | Barnes |
| 5,856,842 A | 1/1999 | Tedesco |
| 5,868,951 A | 2/1999 | Schuck et al. |
| 5,886,822 A | 3/1999 | Spitzer |
| 5,892,598 A | 4/1999 | Asakawa et al. |
| 5,898,511 A | 4/1999 | Mizutani et al. |
| 5,903,395 A | 5/1999 | Rallison et al. |
| 5,907,416 A | 5/1999 | Hegg et al. |
| 5,907,436 A | 5/1999 | Perry et al. |
| 5,917,459 A | 6/1999 | Son et al. |
| 5,926,147 A | 7/1999 | Sehm et al. |
| 5,929,946 A | 7/1999 | Sharp et al. |
| 5,937,115 A | 8/1999 | Domash |
| 5,942,157 A | 8/1999 | Sutherland et al. |
| 5,945,893 A | 8/1999 | Plessky et al. |
| 5,949,302 A | 9/1999 | Sarkka |
| 5,966,223 A | 10/1999 | Friesem et al. |
| 5,985,422 A | 11/1999 | Krauter |
| 5,991,087 A | 11/1999 | Rallison |
| 5,999,314 A | 12/1999 | Asakura et al. |
| 6,042,947 A | 3/2000 | Asakura et al. |
| 6,043,585 A | 3/2000 | Plessky et al. |
| 6,075,626 A | 6/2000 | Mizutani et al. |
| 6,078,427 A | 6/2000 | Fontaine et al. |
| 6,115,152 A | 9/2000 | Popovich et al. |
| 6,127,066 A | 10/2000 | Ueda et al. |
| 6,137,630 A | 10/2000 | Tsou et al. |
| 6,169,613 B1 | 1/2001 | Amitai et al. |
| 6,176,837 B1 | 1/2001 | Foxlin |
| 6,195,206 B1 | 2/2001 | Yona et al. |
| 6,222,675 B1 | 4/2001 | Mall et al. |
| 6,222,971 B1 | 4/2001 | Veligdan et al. |
| 6,249,386 B1 | 6/2001 | Yona et al. |
| 6,259,423 B1 | 7/2001 | Tokito et al. |
| 6,259,559 B1 | 7/2001 | Kobayashi et al. |
| 6,285,813 B1 | 9/2001 | Schultz et al. |
| 6,317,083 B1 | 11/2001 | Johnson et al. |
| 6,317,227 B1 | 11/2001 | Mizutani et al. |
| 6,321,069 B1 | 11/2001 | Piirainen |
| 6,327,089 B1 | 12/2001 | Hosaki et al. |
| 6,333,819 B1 | 12/2001 | Svedenkrans |
| 6,340,540 B1 | 1/2002 | Ueda et al. |
| 6,351,333 B2 | 2/2002 | Araki et al. |
| 6,356,172 B1 | 3/2002 | Koivisto et al. |
| 6,359,730 B2 | 3/2002 | Tervonen |
| 6,359,737 B1 | 3/2002 | Stringfellow |
| 6,366,378 B1 | 4/2002 | Tervonen et al. |
| 6,392,812 B1 | 5/2002 | Howard |
| 6,409,687 B1 | 6/2002 | Foxlin |
| 6,470,132 B1 | 10/2002 | Nousiainen et al. |
| 6,486,997 B1 | 11/2002 | Bruzzone et al. |
| 6,504,518 B1 | 1/2003 | Kuwayama et al. |
| 6,524,771 B2 | 2/2003 | Maeda et al. |
| 6,545,778 B2 | 4/2003 | Ono et al. |
| 6,550,949 B1 | 4/2003 | Bauer et al. |

(56) References Cited

U.S. PATENT DOCUMENTS

| | | | |
|---|---|---|---|
| 6,557,413 B2 | 5/2003 | Nieminen et al. |
| 6,563,648 B2 | 5/2003 | Gleckman et al. |
| 6,580,529 B1 | 6/2003 | Amitai et al. |
| 6,583,873 B1 | 6/2003 | Goncharov et al. |
| 6,587,619 B1 | 7/2003 | Kinoshita |
| 6,598,987 B1 | 7/2003 | Parikka |
| 6,608,720 B1 | 8/2003 | Freeman |
| 6,611,253 B1 | 8/2003 | Cohen |
| 6,646,810 B2 | 11/2003 | Harter et al. |
| 6,661,578 B2 | 12/2003 | Hedrick |
| 6,674,578 B2 | 1/2004 | Sugiyama et al. |
| 6,686,815 B1 | 2/2004 | Mirshekarl-Syahkal et al. |
| 6,690,516 B2 | 2/2004 | Aritake et al. |
| 6,721,096 B2 | 4/2004 | Bruzzone et al. |
| 6,741,189 B1 | 5/2004 | Gibbons, II et al. |
| 6,744,478 B1 | 6/2004 | Asakura et al. |
| 6,748,342 B1 | 6/2004 | Dickhaus |
| 6,750,941 B2 | 6/2004 | Satoh et al. |
| 6,750,995 B2 | 6/2004 | Dickson |
| 6,757,105 B2 | 6/2004 | Niv et al. |
| 6,771,403 B1 | 8/2004 | Endo et al. |
| 6,776,339 B2 | 8/2004 | Piikivi |
| 6,781,701 B1 | 8/2004 | Sweetser et al. |
| 6,805,490 B2 | 10/2004 | Levola |
| 6,825,987 B2 | 11/2004 | Repetto et al. |
| 6,829,095 B2 | 12/2004 | Amitai |
| 6,833,955 B2 | 12/2004 | Niv |
| 6,836,369 B2 | 12/2004 | Fujikawa et al. |
| 6,844,212 B2 | 1/2005 | Bond et al. |
| 6,844,980 B2 | 1/2005 | He et al. |
| 6,847,274 B2 | 1/2005 | Salmela et al. |
| 6,847,488 B2 | 1/2005 | Travis |
| 6,853,491 B1 | 2/2005 | Ruhle et al. |
| 6,864,861 B2 | 3/2005 | Schehrer et al. |
| 6,864,927 B1 | 3/2005 | Cathey |
| 6,885,483 B2 | 4/2005 | Takada |
| 6,903,872 B2 | 6/2005 | Schrader |
| 6,909,345 B1 | 6/2005 | Salmela et al. |
| 6,917,375 B2 | 7/2005 | Akada et al. |
| 6,922,267 B2 | 7/2005 | Endo et al. |
| 6,926,429 B2 | 8/2005 | Barlow et al. |
| 6,940,361 B1 | 9/2005 | Jokio et al. |
| 6,950,173 B1 | 9/2005 | Sutherland et al. |
| 6,950,227 B2 | 9/2005 | Schrader |
| 6,951,393 B2 | 10/2005 | Koide |
| 6,952,312 B2 | 10/2005 | Weber et al. |
| 6,958,662 B1 | 10/2005 | Salmela et al. |
| 6,987,908 B2 | 1/2006 | Bond et al. |
| 7,003,187 B2 | 2/2006 | Frick et al. |
| 7,018,744 B2 | 3/2006 | Otaki et al. |
| 7,021,777 B2 | 4/2006 | Amitai |
| 7,026,892 B2 | 4/2006 | Kajiya |
| 7,034,748 B2 | 4/2006 | Kajiya |
| 7,053,735 B2 | 5/2006 | Salmela et al. |
| 7,058,434 B2 | 6/2006 | Wang et al. |
| 7,095,562 B1 | 8/2006 | Peng et al. |
| 7,101,048 B2 | 9/2006 | Travis |
| 7,110,184 B1 | 9/2006 | Yona et al. |
| 7,123,418 B2 | 10/2006 | Weber et al. |
| 7,126,418 B2 | 10/2006 | Hunton et al. |
| 7,126,583 B1 | 10/2006 | Breed |
| 7,132,200 B1 | 11/2006 | Ueda et al. |
| 7,149,385 B2 | 12/2006 | Parikka et al. |
| 7,151,246 B2 | 12/2006 | Fein et al. |
| 7,158,095 B2 | 1/2007 | Jenson et al. |
| 7,181,105 B2 | 2/2007 | Teramura et al. |
| 7,181,108 B2 | 2/2007 | Levola |
| 7,184,615 B2 | 2/2007 | Levola |
| 7,190,849 B2 | 3/2007 | Katase |
| 7,199,934 B2 | 4/2007 | Yamasaki |
| 7,205,960 B2 | 4/2007 | David |
| 7,205,964 B1 | 4/2007 | Yokoyama et al. |
| 7,206,107 B2 | 4/2007 | Levola |
| 7,230,767 B2 | 6/2007 | Walck et al. |
| 7,242,527 B2 | 7/2007 | Spitzer et al. |
| 7,248,128 B2 | 7/2007 | Mattila et al. |
| 7,259,906 B1 | 8/2007 | Islam |
| 7,268,946 B2 | 9/2007 | Wang |
| 7,285,903 B2 | 10/2007 | Cull et al. |
| 7,286,272 B2 | 10/2007 | Mukawa |
| 7,289,069 B2 | 10/2007 | Ranta |
| 7,299,983 B2 | 11/2007 | Piikivi |
| 7,313,291 B2 | 12/2007 | Okhotnikov et al. |
| 7,319,573 B2 | 1/2008 | Nishiyama |
| 7,320,534 B2 | 1/2008 | Sugikawa et al. |
| 7,323,275 B2 | 1/2008 | Otaki et al. |
| 7,336,271 B2 | 2/2008 | Ozeki et al. |
| 7,339,737 B2 | 3/2008 | Urey et al. |
| 7,339,742 B2 | 3/2008 | Amitai et al. |
| 7,375,870 B2 | 5/2008 | Schorpp |
| 7,391,573 B2 | 6/2008 | Amitai |
| 7,394,865 B2 | 7/2008 | Borran et al. |
| 7,395,181 B2 | 7/2008 | Foxlin |
| 7,397,606 B1 | 7/2008 | Peng et al. |
| 7,401,920 B1 | 7/2008 | Kranz et al. |
| 7,404,644 B2 | 7/2008 | Evans et al. |
| 7,410,286 B2 | 8/2008 | Travis |
| 7,411,637 B2 | 8/2008 | Weiss |
| 7,415,173 B2 | 8/2008 | Kassamakov et al. |
| 7,418,170 B2 | 8/2008 | Mukawa et al. |
| 7,433,116 B1 | 10/2008 | Islam |
| 7,436,568 B1 | 10/2008 | Kuykendall, Jr. |
| 7,454,103 B2 | 11/2008 | Parriaux |
| 7,457,040 B2 | 11/2008 | Amitai |
| 7,466,994 B2 | 12/2008 | Pihlaja et al. |
| 7,479,354 B2 | 1/2009 | Ueda et al. |
| 7,480,215 B2 | 1/2009 | Makela et al. |
| 7,482,996 B2 | 1/2009 | Larson et al. |
| 7,483,604 B2 | 1/2009 | Levola |
| 7,492,512 B2 | 2/2009 | Niv et al. |
| 7,496,293 B2 | 2/2009 | Shamir et al. |
| 7,500,104 B2 | 3/2009 | Goland |
| 7,528,385 B2 | 5/2009 | Volodin et al. |
| 7,545,429 B2 | 6/2009 | Travis |
| 7,550,234 B2 | 6/2009 | Otaki et al. |
| 7,567,372 B2 | 7/2009 | Schorpp |
| 7,570,429 B2 | 8/2009 | Maliah et al. |
| 7,572,555 B2 | 8/2009 | Takizawa et al. |
| 7,573,640 B2 | 8/2009 | Nivon et al. |
| 7,576,916 B2 | 8/2009 | Amitai |
| 7,577,326 B2 | 8/2009 | Amitai |
| 7,579,119 B2 | 8/2009 | Ueda et al. |
| 7,588,863 B2 | 9/2009 | Takizawa et al. |
| 7,589,900 B1 | 9/2009 | Powell |
| 7,589,901 B2 * | 9/2009 | DeJong .............. G02B 27/0081 |
| | | 351/158 |
| 7,592,988 B2 | 9/2009 | Katase |
| 7,593,575 B2 | 9/2009 | Houle et al. |
| 7,597,447 B2 | 10/2009 | Larson et al. |
| 7,599,012 B2 | 10/2009 | Nakamura et al. |
| 7,600,893 B2 | 10/2009 | Laino et al. |
| 7,602,552 B1 | 10/2009 | Blumenfeld |
| 7,616,270 B2 | 11/2009 | Hirabayashi et al. |
| 7,618,750 B2 | 11/2009 | Ueda et al. |
| 7,629,086 B2 | 12/2009 | Otaki et al. |
| 7,639,911 B2 | 12/2009 | Lee et al. |
| 7,643,214 B2 | 1/2010 | Amitai |
| 7,656,585 B1 | 2/2010 | Powell et al. |
| 7,660,047 B1 | 2/2010 | Travis et al. |
| 7,672,055 B2 | 3/2010 | Amitai |
| 7,710,654 B2 | 5/2010 | Ashkenazi et al. |
| 7,724,441 B2 | 5/2010 | Amitai |
| 7,724,442 B2 | 5/2010 | Amitai |
| 7,724,443 B2 | 5/2010 | Amitai |
| 7,733,572 B1 | 6/2010 | Brown et al. |
| 7,747,113 B2 | 6/2010 | Mukawa et al. |
| 7,751,122 B2 | 7/2010 | Amitai |
| 7,764,413 B2 | 7/2010 | Levola |
| 7,777,819 B2 | 8/2010 | Simmonds |
| 7,778,305 B2 | 8/2010 | Parriaux et al. |
| 7,778,508 B2 | 8/2010 | Hirayama |
| 7,847,235 B2 | 12/2010 | Krupkin et al. |

(56) References Cited

U.S. PATENT DOCUMENTS

| | | |
|---|---|---|
| 7,864,427 B2 | 1/2011 | Korenaga et al. |
| 7,865,080 B2 | 1/2011 | Hecker et al. |
| 7,872,804 B2 | 1/2011 | Moon et al. |
| 7,884,985 B2 | 2/2011 | Amitai et al. |
| 7,887,186 B2 | 2/2011 | Watanabe |
| 7,903,921 B2 | 3/2011 | Ostergard |
| 7,907,342 B2 | 3/2011 | Simmonds et al. |
| 7,920,787 B2 | 4/2011 | Gentner et al. |
| 7,944,428 B2 | 5/2011 | Travis |
| 7,969,644 B2 | 6/2011 | Tilleman et al. |
| 7,970,246 B2 | 6/2011 | Travis et al. |
| 7,976,208 B2 | 7/2011 | Travis |
| 7,999,982 B2 | 8/2011 | Endo et al. |
| 8,000,491 B2 | 8/2011 | Brodkin et al. |
| 8,004,765 B2 | 8/2011 | Amitai |
| 8,016,475 B2 | 9/2011 | Travis |
| 8,022,942 B2 | 9/2011 | Bathiche et al. |
| RE42,992 E | 12/2011 | David |
| 8,079,713 B2 | 12/2011 | Ashkenazi |
| 8,082,222 B2 | 12/2011 | Rangarajan et al. |
| 8,086,030 B2 | 12/2011 | Gordon et al. |
| 8,089,568 B1 | 1/2012 | Brown et al. |
| 8,107,023 B2 | 1/2012 | Simmonds et al. |
| 8,107,780 B2 | 1/2012 | Simmonds |
| 8,132,948 B2 | 3/2012 | Owen et al. |
| 8,132,976 B2 | 3/2012 | Odell et al. |
| 8,136,690 B2 | 3/2012 | Fang et al. |
| 8,137,981 B2 | 3/2012 | Andrew et al. |
| 8,149,086 B2 | 4/2012 | Klein et al. |
| 8,152,315 B2 | 4/2012 | Travis et al. |
| 8,155,489 B2 | 4/2012 | Saarikko et al. |
| 8,159,752 B2 | 4/2012 | Wertheim et al. |
| 8,160,409 B2 | 4/2012 | Large |
| 8,160,411 B2 | 4/2012 | Levola et al. |
| 8,186,874 B2 | 5/2012 | Sinbar et al. |
| 8,188,925 B2 | 5/2012 | Dejean |
| 8,189,263 B1 | 5/2012 | Wang et al. |
| 8,189,973 B2 | 5/2012 | Travis et al. |
| 8,199,803 B2 | 6/2012 | Hauske et al. |
| 8,213,065 B2 | 7/2012 | Mukawa |
| 8,233,204 B1 | 7/2012 | Robbins et al. |
| 8,253,914 B2 | 8/2012 | Kajiya et al. |
| 8,254,031 B2 | 8/2012 | Levola |
| 8,295,710 B2 | 10/2012 | Marcus |
| 8,301,031 B2 | 10/2012 | Gentner et al. |
| 8,305,577 B2 | 11/2012 | Kivioja et al. |
| 8,306,423 B2 | 11/2012 | Gottwald et al. |
| 8,314,819 B2 | 11/2012 | Kimmel et al. |
| 8,321,810 B2 | 11/2012 | Heintze |
| 8,335,040 B2 | 12/2012 | Mukawa et al. |
| 8,351,744 B2 | 1/2013 | Travis et al. |
| 8,354,806 B2 | 1/2013 | Travis et al. |
| 8,355,610 B2 | 1/2013 | Simmonds |
| 8,369,019 B2 | 2/2013 | Baker et al. |
| 8,384,694 B2 | 2/2013 | Powell et al. |
| 8,398,242 B2 | 3/2013 | Yamamoto et al. |
| 8,403,490 B2 | 3/2013 | Sugiyama et al. |
| 8,422,840 B2 | 4/2013 | Large |
| 8,427,439 B2 | 4/2013 | Larsen et al. |
| 8,432,363 B2 | 4/2013 | Saarikko et al. |
| 8,432,372 B2 | 4/2013 | Butler et al. |
| 8,447,365 B1 | 5/2013 | Imanuel |
| 8,472,119 B1 | 6/2013 | Kelly |
| 8,472,120 B2 | 6/2013 | Border et al. |
| 8,477,261 B2 | 7/2013 | Travis et al. |
| 8,491,121 B2 | 7/2013 | Tilleman et al. |
| 8,491,136 B2 | 7/2013 | Travis et al. |
| 8,493,366 B2 | 7/2013 | Bathiche et al. |
| 8,493,662 B2 | 7/2013 | Noui |
| 8,508,848 B2 | 8/2013 | Saarikko |
| 8,547,638 B2 | 10/2013 | Levola |
| 8,578,038 B2 | 11/2013 | Kaikuranta et al. |
| 8,581,831 B2 | 11/2013 | Travis |
| 8,582,206 B2 | 11/2013 | Travis |
| 8,593,734 B2 | 11/2013 | Laakkonen |
| 8,611,014 B2 | 12/2013 | Valera et al. |
| 8,619,062 B2 | 12/2013 | Powell et al. |
| 8,633,786 B2 | 1/2014 | Ermolov et al. |
| 8,634,139 B1 | 1/2014 | Brown et al. |
| 8,639,072 B2 | 1/2014 | Popovich et al. |
| 8,643,691 B2 | 2/2014 | Rosenfeld et al. |
| 8,649,099 B2 | 2/2014 | Schultz et al. |
| 8,654,420 B2 | 2/2014 | Simmonds |
| 8,659,826 B1 | 2/2014 | Brown et al. |
| 8,670,029 B2 | 3/2014 | McEldowney |
| 8,693,087 B2 | 4/2014 | Nowatzyk et al. |
| 8,736,802 B2 | 5/2014 | Kajiya et al. |
| 8,736,963 B2 | 5/2014 | Robbins et al. |
| 8,749,886 B2 | 6/2014 | Gupta |
| 8,749,890 B1 | 6/2014 | Wood et al. |
| 8,767,294 B2 | 7/2014 | Chen et al. |
| 8,810,600 B2 | 8/2014 | Bohn et al. |
| 8,814,691 B2 | 8/2014 | Haddick et al. |
| 8,830,584 B2 | 9/2014 | Saarikko et al. |
| 8,830,588 B1 | 9/2014 | Brown et al. |
| 8,903,207 B1 | 12/2014 | Brown et al. |
| 8,913,324 B2 | 12/2014 | Schrader |
| 8,937,772 B1 | 1/2015 | Burns et al. |
| 8,938,141 B2 | 1/2015 | Magnusson |
| 8,964,298 B2 | 2/2015 | Haddick et al. |
| 9,097,890 B2 | 8/2015 | Miller et al. |
| 9,244,280 B1 | 1/2016 | Tiana et al. |
| 9,366,864 B1 | 6/2016 | Brown et al. |
| 9,456,744 B2 | 10/2016 | Popovich et al. |
| 9,523,852 B1 | 12/2016 | Brown et al. |
| 9,632,226 B2 | 4/2017 | Waldern et al. |
| 2002/0021461 A1 | 2/2002 | Ono et al. |
| 2002/0131175 A1 | 9/2002 | Yagi et al. |
| 2003/0030912 A1 | 2/2003 | Gleckman et al. |
| 2003/0039442 A1 | 2/2003 | Bond et al. |
| 2003/0063042 A1 | 4/2003 | Friesem et al. |
| 2003/0149346 A1 | 8/2003 | Arnone et al. |
| 2003/0228019 A1 | 12/2003 | Eichler et al. |
| 2004/0089842 A1 | 5/2004 | Sutherland et al. |
| 2004/0130797 A1 | 7/2004 | Leigh Travis |
| 2004/0188617 A1 | 9/2004 | Devitt et al. |
| 2004/0208446 A1 | 10/2004 | Bond et al. |
| 2004/0208466 A1 | 10/2004 | Mossberg et al. |
| 2005/0135747 A1 | 6/2005 | Greiner et al. |
| 2005/0136260 A1 | 6/2005 | Garcia |
| 2005/0259302 A9 | 11/2005 | Metz et al. |
| 2005/0269481 A1 | 12/2005 | David et al. |
| 2006/0093793 A1 | 5/2006 | Miyakawa et al. |
| 2006/0114564 A1 | 6/2006 | Sutherland et al. |
| 2006/0119916 A1 | 6/2006 | Sutherland et al. |
| 2006/0132914 A1 | 6/2006 | Weiss et al. |
| 2006/0215244 A1 | 9/2006 | Yosha et al. |
| 2006/0221448 A1 | 10/2006 | Nivon et al. |
| 2006/0228073 A1 | 10/2006 | Mukawa et al. |
| 2006/0279662 A1 | 12/2006 | Kapellner et al. |
| 2006/0291021 A1* | 12/2006 | Mukawa .............. G02B 5/32 359/15 |
| 2007/0019152 A1 | 1/2007 | Caputo et al. |
| 2007/0019297 A1 | 1/2007 | Stewart et al. |
| 2007/0041684 A1 | 2/2007 | Popovich et al. |
| 2007/0045596 A1 | 3/2007 | King et al. |
| 2007/0052929 A1 | 3/2007 | Allman et al. |
| 2007/0089625 A1 | 4/2007 | Grinberg et al. |
| 2007/0133920 A1 | 6/2007 | Lee et al. |
| 2007/0133983 A1 | 6/2007 | Traff |
| 2007/0188837 A1 | 8/2007 | Shimizu et al. |
| 2007/0211164 A1 | 9/2007 | Olsen et al. |
| 2008/0043334 A1 | 2/2008 | Itzkovitch et al. |
| 2008/0106775 A1 | 5/2008 | Amitai et al. |
| 2008/0136923 A1 | 6/2008 | Inbar et al. |
| 2008/0151379 A1 | 6/2008 | Amitai |
| 2008/0186604 A1 | 8/2008 | Amitai |
| 2008/0198471 A1 | 8/2008 | Amitai |
| 2008/0278812 A1 | 11/2008 | Amitai |
| 2008/0285140 A1 | 11/2008 | Amitai |
| 2008/0309586 A1 | 12/2008 | Vitale |
| 2009/0017424 A1 | 1/2009 | Yoeli et al. |
| 2009/0019222 A1 | 1/2009 | Verma et al. |
| 2009/0052046 A1 | 2/2009 | Amitai |

(56) References Cited

U.S. PATENT DOCUMENTS

| | | |
|---|---|---|
| 2009/0052047 A1 | 2/2009 | Amitai |
| 2009/0067774 A1 | 3/2009 | Magnusson |
| 2009/0097122 A1 | 4/2009 | Niv |
| 2009/0097127 A1 | 4/2009 | Amitai |
| 2009/0121301 A1 | 5/2009 | Chang |
| 2009/0122413 A1 | 5/2009 | Hoffman et al. |
| 2009/0122414 A1 | 5/2009 | Amitai |
| 2009/0128902 A1 | 5/2009 | Niv et al. |
| 2009/0128911 A1 | 5/2009 | Itzkovitch et al. |
| 2009/0153437 A1 | 6/2009 | Aharoni |
| 2009/0190222 A1* | 7/2009 | Simmonds ............ G02B 6/0028 359/567 |
| 2009/0213208 A1 | 8/2009 | Glatt |
| 2009/0237804 A1 | 9/2009 | Amitai et al. |
| 2009/0303599 A1 | 12/2009 | Levola |
| 2009/0316246 A1 | 12/2009 | Asai et al. |
| 2010/0039796 A1 | 2/2010 | Mukawa |
| 2010/0060551 A1 | 3/2010 | Sugiyama et al. |
| 2010/0060990 A1 | 3/2010 | Wertheim et al. |
| 2010/0079865 A1 | 4/2010 | Saarikko et al. |
| 2010/0092124 A1 | 4/2010 | Magnusson et al. |
| 2010/0096562 A1 | 4/2010 | Klunder et al. |
| 2010/0103078 A1 | 4/2010 | Mukawa et al. |
| 2010/0136319 A1 | 6/2010 | Imai et al. |
| 2010/0141555 A1 | 6/2010 | Rorberg et al. |
| 2010/0165465 A1 | 7/2010 | Levola |
| 2010/0171680 A1 | 7/2010 | Lapidot et al. |
| 2010/0177388 A1 | 7/2010 | Cohen et al. |
| 2010/0214659 A1 | 8/2010 | Levola |
| 2010/0231693 A1 | 9/2010 | Levola |
| 2010/0231705 A1 | 9/2010 | Yahav et al. |
| 2010/0232003 A1 | 9/2010 | Baldy et al. |
| 2010/0246004 A1 | 9/2010 | Simmonds |
| 2010/0246993 A1 | 9/2010 | Rieger et al. |
| 2010/0265117 A1 | 10/2010 | Weiss |
| 2010/0277803 A1* | 11/2010 | Pockett ............ G02B 27/4277 359/567 |
| 2010/0284085 A1 | 11/2010 | Laakkonen |
| 2010/0296163 A1 | 11/2010 | Saarikko |
| 2010/0315719 A1 | 12/2010 | Saarikko et al. |
| 2010/0321781 A1* | 12/2010 | Levola ............ G02B 27/0081 359/569 |
| 2011/0002143 A1 | 1/2011 | Saarikko et al. |
| 2011/0013423 A1 | 1/2011 | Selbrede et al. |
| 2011/0019250 A1 | 1/2011 | Aiki et al. |
| 2011/0019874 A1 | 1/2011 | Jarvenpaa et al. |
| 2011/0026128 A1 | 2/2011 | Baker et al. |
| 2011/0026774 A1 | 2/2011 | Flohr et al. |
| 2011/0038024 A1 | 2/2011 | Wang et al. |
| 2011/0050548 A1 | 3/2011 | Blumenfeld et al. |
| 2011/0096401 A1 | 4/2011 | Levola |
| 2011/0157707 A1 | 6/2011 | Tilleman et al. |
| 2011/0164221 A1 | 7/2011 | Tilleman et al. |
| 2011/0211239 A1 | 9/2011 | Mukawa et al. |
| 2011/0235179 A1 | 9/2011 | Simmonds |
| 2011/0235365 A1 | 9/2011 | McCollum et al. |
| 2011/0238399 A1 | 9/2011 | Ophir et al. |
| 2011/0242661 A1 | 10/2011 | Simmonds |
| 2011/0242670 A1 | 10/2011 | Simmonds |
| 2011/0310356 A1 | 12/2011 | Vallius |
| 2012/0007979 A1 | 1/2012 | Schneider et al. |
| 2012/0033306 A1 | 2/2012 | Valera et al. |
| 2012/0044572 A1 | 2/2012 | Simmonds et al. |
| 2012/0044573 A1 | 2/2012 | Simmonds et al. |
| 2012/0062850 A1 | 3/2012 | Travis |
| 2012/0099203 A1 | 4/2012 | Boubis et al. |
| 2012/0105634 A1 | 5/2012 | Meidan et al. |
| 2012/0120493 A1 | 5/2012 | Simmonds et al. |
| 2012/0127577 A1 | 5/2012 | Desserouer |
| 2012/0224062 A1 | 9/2012 | Lacoste et al. |
| 2012/0235884 A1 | 9/2012 | Miller et al. |
| 2012/0235900 A1 | 9/2012 | Border et al. |
| 2012/0242661 A1 | 9/2012 | Takagi et al. |
| 2012/0280956 A1 | 11/2012 | Yamamoto et al. |
| 2012/0294037 A1 | 11/2012 | Holman et al. |
| 2012/0300311 A1 | 11/2012 | Simmonds et al. |
| 2012/0320460 A1 | 12/2012 | Levola |
| 2013/0069850 A1 | 3/2013 | Mukawa et al. |
| 2013/0101253 A1 | 4/2013 | Popovich et al. |
| 2013/0138275 A1 | 5/2013 | Nauman et al. |
| 2013/0141937 A1 | 6/2013 | Katsuta et al. |
| 2013/0170031 A1 | 7/2013 | Bohn et al. |
| 2013/0184904 A1 | 7/2013 | Gadzinski |
| 2013/0200710 A1 | 8/2013 | Robbins |
| 2013/0249895 A1 | 9/2013 | Westerinen et al. |
| 2013/0250207 A1 | 9/2013 | Bohn |
| 2013/0257848 A1 | 10/2013 | Westerinen et al. |
| 2013/0258701 A1 | 10/2013 | Westerinen et al. |
| 2013/0314793 A1 | 11/2013 | Robbins et al. |
| 2013/0322810 A1 | 12/2013 | Robbins |
| 2013/0328948 A1 | 12/2013 | Kunkel et al. |
| 2014/0043689 A1 | 2/2014 | Mason |
| 2014/0104665 A1* | 4/2014 | Popovich ............ G02B 27/0176 359/15 |
| 2014/0104685 A1 | 4/2014 | Bohn et al. |
| 2014/0140653 A1 | 5/2014 | Brown et al. |
| 2014/0140654 A1 | 5/2014 | Brown et al. |
| 2014/0146394 A1 | 5/2014 | Tout et al. |
| 2014/0152778 A1 | 6/2014 | Ihlenburg et al. |
| 2014/0168055 A1 | 6/2014 | Smith |
| 2014/0168260 A1 | 6/2014 | O'Brien et al. |
| 2014/0168735 A1 | 6/2014 | Yuan et al. |
| 2014/0172296 A1 | 6/2014 | Shtukater |
| 2014/0176528 A1 | 6/2014 | Robbins |
| 2014/0204455 A1 | 7/2014 | Popovich et al. |
| 2014/0211322 A1 | 7/2014 | Bohn et al. |
| 2014/0218801 A1 | 8/2014 | Simmonds et al. |
| 2014/0300966 A1 | 10/2014 | Travers et al. |
| 2015/0010265 A1 | 1/2015 | Popovich et al. |
| 2015/0167868 A1 | 6/2015 | Boncha |
| 2015/0177688 A1 | 6/2015 | Popovich et al. |
| 2015/0277375 A1 | 10/2015 | Large et al. |
| 2015/0289762 A1 | 10/2015 | Popovich et al. |
| 2015/0316768 A1 | 11/2015 | Simmonds |
| 2016/0178901 A1 | 6/2016 | Ishikawa |
| 2016/0209657 A1 | 7/2016 | Popovich et al. |
| 2016/0238772 A1 | 8/2016 | Waldern et al. |
| 2017/0031160 A1 | 2/2017 | Popovich et al. |
| 2018/0052277 A1 | 2/2018 | Schowengerdt et al. |

FOREIGN PATENT DOCUMENTS

| | | |
|---|---|---|
| DE | 1020060 03 785 | 7/2007 |
| EP | 0 822 441 | 2/1998 |
| EP | 2 110 701 | 10/2009 |
| EP | 2 225 592 | 9/2010 |
| EP | 2 381 290 | 10/2011 |
| EP | 2 733 517 | 5/2014 |
| FR | 2677463 | 12/1992 |
| GB | 2 115 178 A | 9/1983 |
| JP | 2002-529790 A | 9/2002 |
| JP | 2004-157245 | 6/2004 |
| JP | 2006-350129 A | 12/2006 |
| JP | 2007-011057 A | 1/2007 |
| JP | 2007-219106 A | 8/2007 |
| JP | 2016-030503 | 3/2016 |
| WO | WO-99/52002 | 10/1999 |
| WO | WO-00/28369 A2 | 5/2000 |
| WO | WO-03/081320 A1 | 10/2003 |
| WO | WO-2006/002870 | 1/2006 |
| WO | WO-2007/130130 A2 | 11/2007 |
| WO | WO-2009/013597 A2 | 1/2009 |
| WO | WO-2009/077802 | 6/2009 |
| WO | WO-2010/067114 | 6/2010 |
| WO | WO-2010/067117 | 6/2010 |
| WO | WO-2010/125337 A2 | 11/2010 |
| WO | WO-2010/125337 A3 | 11/2010 |
| WO | WO-2011/012825 | 2/2011 |
| WO | WO-2011/051660 A1 | 5/2011 |
| WO | WO-2011/055109 A2 | 5/2011 |
| WO | WO-2011/107831 | 9/2011 |
| WO | WO-2013/027006 A1 | 2/2013 |
| WO | WO-2013/033274 A1 | 3/2013 |

(56) References Cited

FOREIGN PATENT DOCUMENTS

| WO | WO-2013/163347 | 10/2013 |
|---|---|---|
| WO | WO-2014/091200 | 6/2014 |
| WO | WO-2016/044193 | 3/2016 |

OTHER PUBLICATIONS

Final Office Action on U.S. Appl. No. 14/044,676, dated Aug. 12, 2016, 23 pages.
Non-final Office Action on U.S. Appl. No. 13/250,858, dated Nov. 14, 2016, 18 pages.
Non-Final Office Action on U.S. Appl. No. 13/844,456, dated Aug. 16, 2016, 18 pages.
Non-Final Office Action on U.S. Appl. No. 14/465,763, dated Sep. 29, 2016, 4 pages.
Non-Final Office Action on U.S. Appl. No. 14/497,280, dated Sep. 22, 2016, 15 pages.
Non-Final Office Action on U.S. Appl. No. 14/820,237, dated Aug. 5, 2016, 14 pages.
Notice of Allowance on U.S. Appl. No. 14/814,020, dated Aug. 12, 2016, 15 pages.
Extended European Search Report for European Application No. 13765610.4 dated Feb. 16, 2016, 6 pages.
Final Office Action on U.S. Appl. No. 14/168,173, dated Nov. 4, 2015, 10 pages.
Non-Final Office Action on U.S. Appl. No. 13/864,991 dated Nov. 30, 2015, 18 pages.
Non-Final Office Action on U.S. Appl. No. 13/892,026 dated Mar. 22, 2016, 16 pages.
Non-Final Office Action on U.S. Appl. No. 14/152,756, dated Apr. 26, 2016, 17 pages.
Non-Final Office Action on U.S. Appl. No. 14/168,173 dated Mar. 10, 2016, 9 pages.
Non-Final Office Action on U.S. Appl. No. 14/260,943 dated Feb. 3, 2016, 19 pages.
Non-Final Office Action on U.S. Appl. No. 13/250,858, dated Mar. 18, 2016, 20 pages.
U.S. Appl. No. 13/250,858, filed Sep. 30, 2011, Brown et al.
U.S. Appl. No. 13/250,940, filed Sep. 30, 2011, Stahl et al.
U.S. Appl. No. 13/432,662, filed Mar. 28, 2012, Brown et al.
U.S. Appl. No. 14/497,280, filed Sep. 25, 2014, Stanley et al.
U.S. Appl. No. 14/814,020, filed Jul. 30, 2015, Brown et al.
Extract of US 2010/0296163 (Saarikko), Figure 2 as marked up by Examiner in Final Office Action for U.S. Appl. No. 14/044,676 dated Oct. 20, 2015, 1 page.
Final Office Action on U.S. Appl. No. 14/044,676, dated Oct. 20, 2015, 18 pages.
Final Office Action on U.S. Appl. No. 13/250,858, dated Oct. 7, 2015, 20 pages.
Final Office Action on U.S. Appl. No. 13/432,662, dated Oct. 29, 2015, 9 pages.
Non-Final Office Action on U.S. Appl. No. 14/152,756, dated Aug. 25, 2015, 39 pages.
Notice of Allowance on U.S. Appl. No. 14/038,400, dated Oct. 30, 2015, 9 pages.
Second office action received in Chinese patent application No. 201380001530.1, dated Oct. 12, 2015, 5 pages with English translation.
Final Office Action on U.S. Appl. No. 13/869,866 dated Oct. 3, 2014, 17 pages.
Final Office Action on U.S. Appl. No. 14/038,400 dated Aug. 10, 2015, 32 pages.
First office action received in Chinese patent application No. 201380001530.1, dated Jun. 30, 2015, 9 pages with English translation.
Non-Final Office Action on U.S. Appl. No. 13/869,866 dated Jul. 22, 2015, 28 pages.
Non-Final Office Action on U.S. Appl. No. 13/892,026 dated Aug. 6, 2015, 22 pages.
Non-Final Office Action on U.S. Appl. No. 13/892,057 dated Jul. 30, 2015, 29 pages.
Non-Final Office Action on U.S. Appl. No. 14/109,551 dated Jul. 14, 2015, 32 pages.
Non-Final Office Action on U.S. Appl. No. 14/168,173 dated Jun. 22, 2015, 14 pages.
Notice of Allowance on U.S. Appl. No. 13/355,360 dated Apr. 10, 2014, 7 pages.
Office Action, USPTO, U.S. Appl. No. 10/696,507, dated Nov. 13, 2008, 15 pages.
Restriction Requirement for U.S. Appl. No. 12/700,557, dated Oct. 17, 2012, 5 pages.
Amendment and Reply for U.S. Appl. No. 12/571,262, dated Dec. 16, 2011, 7 pages.
Amitai, Y., et al. "Visor-display design based on planar holographic optics," Applied Optics, vol. 34, No. 8, Mar. 10, 1995, pp. 1352-1356.
Ayras et al., Exit Pupil Expander with a Large Field of View Based on Diffractive Optics, Journal of the SID, 2009, 6 pages.
Ayras, et al., "Exit pupil expander with a large field of view based on diffractive optics", Journal of the Society for Information Display, 17/8, 2009, pp. 659-664.
Cameron, A., The Application of Holograhpic Optical Waveguide Technology to Q-Sight Family of Helmet Mounted Displays, Proc. of SPIE, vol. 7326, 7326OH-1, 2009, 11 pages.
Caputo, R. et al., POLICRYPS Switchable Holographic Grating: A Promising Grating Electro-Optical Pixel for High Resolution Display Application; Journal of Display Technology, vol. 2, No. 1, Mar. 2006, pp. 38-51, 14 pages.
Crawford, "Switchable Bragg Gratings", Optics & Photonics News, Apr. 2003, pp. 54-59.
Extended European Search Report for EP Application No. 13192383, dated Apr. 2, 2014, 7 pages.
Final Office Action in U.S. Appl. No. 13/864,991, dated Apr. 2, 2015, 16 pages.
Final Office Action on U.S. Appl. No. 13/250,858 dated Feb. 4, 2015, 18 pages.
Final Office Action on U.S. Appl. No. 13/250,940 dated Oct. 17, 2014, 15 pages.
Final Office Action on U.S. Appl. No. 13/892,026 dated Apr. 3, 2015, 17 pages.
Final Office Action on U.S. Appl. No. 13/892,057 dated Mar. 5, 2015, 21 pages.
International Preliminary Report on Patentability for PCT Application No. PCT/US2013/038070, dated Oct. 28, 2014, 6 pages.
International Search Report and Written Opinion regarding PCT/US2013/038070, dated Aug. 14, 2013, 14 pages.
Irie, Masahiro, Photochromic diarylethenes for photonic devices, Pure and Applied Chemistry, 1996, pp. 1367-1371, vol. 68, No. 7, IUPAC.
Levola, et al., "Replicated slanted gratings with a high refractive index material for in and outcoupling of light" Optics Express, vol. 15, Issue 5, pp. 2067-2074 (2007).
Moffitt, "Head-Mounted Display Image Configurations", retrieved from the internet at http://www.kirkmoffitt.com/hmd_image_configurations.pdf on Dec. 19, 2014, dated May 2008, 25 pages.
Non-Final Office Action on U.S. Appl. No. 13/250,858 dated Sep. 15, 2014, 16 pages.
Non-Final Office Action on U.S. Appl. No. 13/250,940 dated Mar. 18, 2015, 17 pages.
Non-Final Office Action on U.S. Appl. No. 13/432,662 dated May 27, 2015, 15 pages.
Non-Final Office Action on U.S. Appl. No. 13/844,456 dated Apr. 1, 2015, XX Pages.
Non-Final Office Action on U.S. Appl. No. 13/864,991 dated Oct. 22, 2014, 16 pages.
Non-Final Office Action on U.S. Appl. No. 13/869,866 dated May 28, 2014, 16 pages.
Non-Final Office Action on U.S. Appl. No. 14/038,400 dated Feb. 5, 2015, 18 pages.
Non-Final Office Action on U.S. Appl. No. 14/044,676 dated Apr. 9, 2015, 13 pages.

(56) References Cited

OTHER PUBLICATIONS

Non-Final Office Action on U.S. Appl. No. 14/225062 dated May 21, 2015, 11 pages.
Nordin, G., et al., Journal of the Optical Society of America A., vol. 9, No. 12, Dec. 1992, pp. 2206-2217, 12 pages.
Notice of Allowance for U.S. Appl. No. 12/700,557, dated Oct. 22, 2013, 9 pages.
Notice of Allowance on U.S. Appl. No. 13/250,970 dated Sep. 16, 2014, 7 pages.
Notice of Allowance on U.S. Appl. No. 13/251,087 dated Jul. 17, 2014, 8 pages.
Office Action for U.S. Appl. No. 12/571,262, dated Sep. 28, 2011, 5 pages.
Office Action for U.S. Appl. No. 12/700,557, dated Aug. 9, 2013, 12 pages.
Office Action for U.S. Appl. No. 12/700,557, dated Feb. 4, 2013, 11 pages.
Office Action for U.S. Appl. No. 13/250,621, dated May 21, 2013, 10 pages.
Office Action for U.S. Appl. No. 13/250,858 dated Feb. 19, 2014, 13 page.
Office Action for U.S. Appl. No. 13/250,858, dated Oct. 28, 2013, 9 pages.
Office Action for U.S. Appl. No. 13/250,940, dated Aug. 28, 2013, 10 pages.
Office Action for U.S. Appl. No. 13/250,940, dated Aug. 28, 2013, 15 pages.
Office Action for U.S. Appl. No. 13/250,940, dated Mar. 12, 2013, 11 pages.
Office Action for U.S. Appl. No. 13/250,970, dated Jul. 30, 2013, 4 pages.
Office Action for U.S. Appl. No. 13/250,994, dated Sep. 16, 2013, 11 pages.
Office Action for U.S. Appl. No. 13/355,360, dated Sep. 12, 2013, 7 pages.
Office Action on U.S. Appl. No. 13/250,940 dated Mar. 25, 2014, 12 pages.
Office Action on U.S. Appl. No. 13/251,087 dated Mar. 28, 2014, 12 pages.
Office Action on U.S. Appl. No. 13/892,026 dated Dec. 8, 2014, 19 pages.
Office Action on U.S. Appl. No. 13/892,057 dated Nov. 28, 2014, 17 pages.
Plastic has replaced glass in photochromic lens, www.plastemart.com, 2003, 1 page.
Press Release, "USAF Awards SBG Labs an SBIR Contract for Wide Field of View HUD", SBG Labs—DigiLens, Apr. 2013, 1 page.
Press Release: "Navy awards SGB Labs a contract for HMDs for simulation and training", Press releases, DigiLens, Oct. 2012, pp. 1-2, retrieved from the internat at http://www.digilens.com/pr10-2012.2.php. 2 pages.
Requirement for Restriction/Election on U.S. Appl. No. 13/844,456 dated Sep. 12, 2014, 23 pages.
Schechter, et al., "Compact beam expander with linear gratings", Applied Optics, vol. 41, No. 7, Mar. 1, 2002, pp. 1236-1240.
Urey, "Diffractive exit pupil expander for display applications" Applied Optics, vol. 40, Issue 32, pp. 5840-5851 (2001).
Webster's Third New International Dictionary 433 (1986), 3 pages.
Wisely, P.L., Head up and head mounted display performance improvements through advanced techniques in the manipulation of light, Proc. of SPIE vol. 7327, 732706-1, 2009, 10 pages.
Non-Final Office Action on U.S. Appl. No. 13/250,858 dated Jun. 12, 2015, 20 pages.
Chinese Office Action issued in corresponding application No. 201310557623 dated Jan. 17, 2017.
Non-Final Office Action on U.S. Appl. No. 13/844,456, dated Dec. 29, 2016, 24 pages.
Non-Final Office Action on U.S. Appl. No. 14/044,676 dated Dec. 29, 2016, 26 pages.
Notice of Reasons for Rejection for Japanese Application No. 2015-509120, with English Translation, dated Nov. 1, 2016, 4 pages.
US Notice of Allowance on U.S. Appl. No. 14/820,237 dated Jan. 23, 2017.
Final Office Action on U.S. Appl. No. 13/892,026 dated Nov. 20, 2015, 25 pages.
Final Office Action on U.S. Appl. No. 13/892,057 dated Nov. 20, 2015, 30 pages.
Final Office Action on U.S. Appl. No. 14/152,756, dated Dec. 21, 2015, 15 pages.
Non-Final Office Action on U.S. Appl. No. 13/844,456, dated Jan. 15, 2016, 16 Pages.
Non-Final Office Action on U.S. Appl. No. 14/044,676, dated Jan. 20, 2016, 21 pages.
Non-Final Office Action on U.S. Appl. No. 14/465,763, dated Nov. 19, 2015, 4 pages.
Notice of Allowance for U.S. Appl. No. 14/109,551, dated Nov. 20, 2015, 8 pages.
Notice of Allowance on U.S. Appl. No. 13/432,662, dated Feb. 18, 2016, 10 pages.
Notice of Allowance on U.S. Appl. No. 14/225,062, dated Dec. 2, 2015, 10 pages.
Final Notice of Reasons for Rejection on Japanese Application No. JP2015-509120, dated Mar. 7, 2017, English Translation, 2 pages.
Final Office Action on U.S. Appl. No. 14/152,756, dated Oct. 12, 2016, 18 pages.
Final Office Action on U.S. Appl. No. 14/497,280, dated Mar. 10, 2017, 17 pages.
First Office Action on EPO Application No. 13765610.4, dated Apr. 18, 2017, 4 pages.
Non-Final Office Action on U.S. Appl. No. 14/152,756, dated Feb. 21, 2017, 18 pages.
Non-Final Office Action on U.S. Appl. No. 15/005,507, dated Nov. 22, 2016, 7 pages.
Final Office Action for U.S. Appl. No. 14/044,676 dated Jul. 13, 2017. 31 pages.
Final Office Action for U.S. Appl. No. 13/844,456 dated Jul. 10, 2017. 20 pages.
Final Office Action on U.S. Appl. No. 14/152,756, dated Jun. 7, 2017, 16 pages.
First Office Action on Japanese Application No. 2013-231450, dated Aug. 8, 2017, 5 pages.
Non-Final Office Action for U.S. Appl. No. 13/844,456 dated Oct. 6, 2017. 23 pages.
Non-Final Office Action for U.S. Appl. No. 15/136,841 dated Jul. 13, 2017. 36 pages.
Non-Final Office Action for U.S. Appl. No. 15/136,841 dated Oct. 27, 2017. 15 pages.
Non-Final Office Action on U.S. Appl. No. 14/754,368, dated May 8, 2017, 12 pages.
Non-Final Office Action on U.S. Appl. No. 15/178,521, dated Aug. 24, 2017, 34 pages.
Corrected Notice of Allowance for U.S. Appl. No. 14/044,676 dated Feb. 1, 2018. 2 pages.
Corrected Notice of Allowance for U.S. Appl. No. 14/044,676 dated Jan. 3, 2018. 2 pages.
International Search Report and Written Opinion for PCT/US18/12227, dated Mar. 14, 2018. 9 pages.
Non-Final Office Action for U.S. Appl. No. 14/152,756 dated Feb. 13, 2018. 17 pages.
Non-Final Office Action for U.S. Appl. No. 14/497,280 dated Mar. 19, 2018. 19 pages.
Non-Final Office Action for U.S. Appl. No. 15/136,841 dated Mar. 12, 2018. 12 pages.
Notice of Allowance for U.S. Appl. No. 15/178,521 dated Jan. 31, 2018. 9 pages.
Final Office Action for U.S. Appl. No. 13/844,456 dated Apr. 19. 2018. 24 pages.
Chinese First Office Action for Chinese Patent Application No. 201610512319.1 dated Aug. 11, 2017. 16 pages.
European Office Action for European Patent Application No. 13192383.1 dated Oct. 16, 2017. 5 pages.

(56) References Cited

OTHER PUBLICATIONS

Notice of Allowance for U.S. Appl. No. 14/044676 dated Nov. 24, 2017. 18 pages.
Second Office Action for Chinese Patent Application No. 201310557623.4 dated Dec. 1, 2017. 21 pages.
Final Office Action for U.S. Appl. No. 14/465,763 dated Jun. 28, 2018. 4 pages.
Notice of Allowance for U.S. Appl. No. 15/439,597 dated Jun. 15, 2018. 11 pages.
Second Office Action for Chinese Patent Application No. 201610512319.1 dated May 2, 2018. 9 pages.
Third Office Action for Chinese Patent Application No. 20130557623.4 dated May 22, 2018. 7 pages.

* cited by examiner

TURNING LIGHT PIPE FOR A PUPIL EXPANSION SYSTEM AND METHOD

CROSS-REFERENCE TO RELATED PATENT APPLICATIONS

The present disclosure is related to U.S. patent application Ser. No. 14/497,280, filed Sep. 25, 2014; U.S. patent application Ser. No. 14/465,763 filed on Aug. 21, 2014, which claims the benefit of and priority to and is a Continuation of U.S. patent application Ser. No. 13/355,360, filed on Jan. 20, 2012 (now U.S. Pat. No. 8,817,350, issued on Aug. 26, 2014), which claims the benefit of and priority to and is a Continuation of U.S. patent application Ser. No. 12/571,262 filed on Sep. 30, 2009 (now U.S. Pat. No. 8,233,204, issued on Jul. 31, 2012); U.S. patent application Ser. No. 13/869,866 filed on Apr. 24, 2013, which claims the benefit of and priority to U.S. Provisional Patent Application No. 61/687,436 filed on Apr. 25, 2012, and U.S. Provisional Patent Application No. 61/689,907 filed on Jun. 15, 2012; and U.S. patent application Ser. No. 13/844,456 filed on Mar. 15, 2013, which claims the benefit of and priority to U.S. Provisional Patent Application No. 61/796,632 filed on Nov. 16, 2012, and U.S. Provisional Patent Application No. 61/849,853 filed on Feb. 4, 2013, all of which incorporated herein by reference.

The present disclosure is also related to: U.S. patent application Ser. No. 13/251,087, filed on Sep. 30, 2011; U.S. patent application Ser. No. 13/250,940 filed on Sep. 30, 2011, incorporated herein by reference, and assigned to the assignee of the present application; U.S. patent application Ser. No. 13/250,858 filed on Sep. 30, 2011, incorporated herein by reference in its entirety, and assigned to the assignee of the present application; U.S. patent application Ser. No. 13/250,970 filed on Sep. 30, 2011, incorporated herein by reference in its entirety, and assigned to the assignee of the present application; U.S. patent application Ser. No. 13/250,994 filed on Sep. 30, 2011, incorporated herein by reference in its entirety, and assigned to the assignee of the present application; and U.S. patent application Ser. No. 13/250,621, filed on Sep. 30, 2011, incorporated herein by reference herein in its entirety and assigned to the assignee of the present application.

BACKGROUND

The present disclosure relates to substrate guided displays including but not limited to head up displays (HUDs), helmet mounted displays (HMDs), wearable displays, near eye displays, head down displays (HDDs), etc.

Substrate guided displays have been proposed which use waveguide technology with diffraction gratings to preserve eye box size while reducing lens size. U.S. Pat. No. 4,309,070 issued to St. Leger Searle and U.S. Pat. No. 4,711,512 issued to Upatnieks disclose head up displays including a waveguide where the pupil of a collimating optical system is effectively expanded by the waveguide. The U.S. patent applications listed in the Cross Reference to Related Applications above disclose compact head up displays (HUDS) and near eye displays using multiple gratings, multiple waveguides, and/or multiple waveguide layers for pupil expansion.

Pupil expansion using multiple layers or multiple waveguides with input and output diffraction gratings adds to the complexity of the waveguide display. For example, pupil expansion using multiple layers, multiple waveguides, and/or multiple gratings can add to the size, weight and cost of the display and can reduce the brightness and contrast of the display. Further, expanding the pupil from a small round collimating lens in two directions using two or more waveguides or using three or more gratings to produce a final expanded pupil can be lossy due to air gaps and the number of gratings. The air gaps can induce geometric coupling losses. Further, expanding the pupil from a small round collimating lens in two directions using two or more waveguides or using three or more gratings to produce a final expanded pupil can add haze to the final image.

Therefore, there is a need for a display with reduced complexity, size, cost, and weight. There is further a need for a compact wearable display that uses diffraction gratings and is not susceptible to haze. Further, there is a need for a compact HUD which uses collimating optics optimized for constrained spaces associated with smaller aircraft. Yet further still, there is also a need for a small volume, lightweight, lower cost waveguide display with less lossiness and haze. Yet further, there is a need for a substrate waveguide near eye display or HUD that requires fewer gratings for pupil expansion. Yet further, there is a need for a wearable display or HMD that requires fewer gratings for pupil expansion. Yet further, there is a need to mitigate solar flare effects associated with waveguide displays.

SUMMARY

In one aspect, the inventive concepts disclosed herein are directed to a near eye optical display. The near eye display includes a light pipe including elongated surfaces and an input coupler. The light pipe is configured to provide an image received by the input coupler and expand the image in a first direction through one of the elongated surfaces. The near eye display also includes a waveguide including an output grating, a first surface, a second surface, and a side surface. The first surface and the second surface have a larger area than the side surface, and the output grating is configured to provide the image expanded in a second direction. The second direction is different than the first direction. The image enters the waveguide from the one of the elongated surfaces at the side surface.

In one aspect, the inventive concepts disclosed herein are directed to a method of displaying information. The method includes receiving light in a light pipe having a surface with a non-gradient or gradient reflection coating, receiving the light from the surface with the non-gradient or gradient reflective coating in a waveguide having a first surface and a second surface, and providing the light to an output grating via total internal reflection between the first surface and the second surface. The method also includes providing the light from the waveguide via the output grating, where the light is provided with dual axis pupil expansion with respect to the light received in the light pipe.

In one aspect, the inventive concepts disclosed herein are directed to an apparatus for providing an image. The apparatus includes a light pipe comprising a non-gradient or gradient reflective coating, and a waveguide comprising an input surface and an output surface. The input surface is non-planar with respect to the output surface. Light from the non-gradient or gradient reflective coating is received at the input surface, and the light is ejected from the output surface of the waveguide by an output grating.

BRIEF DESCRIPTION OF THE DRAWINGS

The exemplary embodiments will become more fully understood from the following detailed description, taken in FIG. 1 is a general block diagram of a display system according to some exemplary embodiments.

DETAILED DESCRIPTION OF EXEMPLARY EMBODIMENTS

Following below are more detailed descriptions of various concepts related to, and embodiments of, an optical display and methods of displaying information. The display system and method can be implemented in any of numerous ways, as the disclosed concepts are not limited to any particular manner of implementation. Examples of specific implementations and applications are provided primarily for illustrative purposes.

Exemplary embodiments will now be further described by way of example with reference to the accompanying drawings. It will be apparent to those skilled in the art that the some embodiments may be practiced with none, one, some or all of the features and advantages as disclosed in the following description. For the purposes of explaining aspects the invention, well-known features of optical technology known to those skilled in the art of optical design and visual displays have been omitted or simplified in order not to obscure the basic principles of some embodiments. In the following description, the terms light, ray, beam and direction may be used interchangeably and in association with each other to indicate the direction of propagation of light energy along rectilinear trajectories. Parts of the following description will be presented using terminology commonly employed by those skilled in the art of optical design.

Referring generally to the Figures, systems and methods relating to near-eye display systems, HUD systems, worn display systems, HMD systems, and HDD systems are shown according to various embodiments. The display system of some embodiments advantageously provides dual axis expansion with less reduction in brightness and contrast as well as less susceptibility to haze. The display system advantageously can be utilized in HMDs or head mounted/worn displays, near eye displays, and HUDs for many applications, including but not limited to military applications, aviation applications, medical applications, entertainment applications, simulation applications, vehicle applications and consumer applications (e.g., augmented reality glasses, etc.) in some embodiments. The display system uses a light pipe to increase the pupil in one direction and a waveguide with a grating to increase the pupil in another direction in some embodiments. Using the systems and methods disclosed herein, a highly integrated, low cost, light weight, display system can be provided which is less susceptible to solar flare effects, brightness, contrast, and haze issues according to some embodiments.

Figure 1:
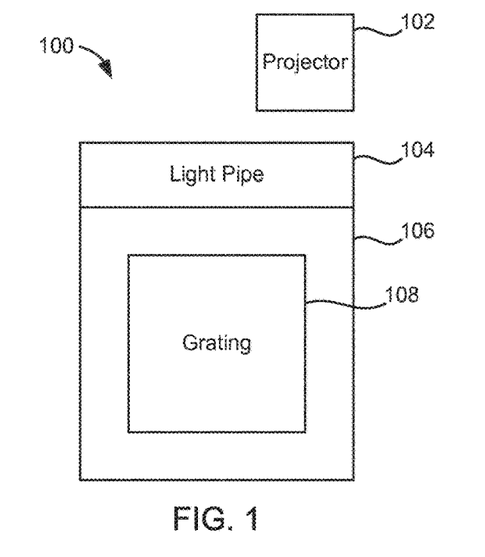

With reference to FIG. 1, a display system 100 can be embodied as a HUD, an HMD, a near-eye display, a worn display, HDD, etc. Display system 100 includes a projector 102, a light pipe 104, and a waveguide 106. Waveguide 106 includes an output coupler or grating 108. Display system 100 provides light in the form of an image into light pipe 104. In some embodiments, light pipe 104 has an input coupler or grating that is responsible for turning the light from projector 102 down light pipe 104 for expansion. Light pipe 104 expands the image in one direction (e.g. from right to left in FIG. 1) and provides the image into waveguide 106 (e.g., via a leaky transmissive coating) in some embodiments. Light travels partially by total internal reflection in waveguide 106 and is ejected by grating 108. Grating 108 expands the pupil in a direction (e.g., vertically) different than the direction that light pipe 104 expands the pupil in some embodiments.

In some embodiments, grating 108 expands the pupil vertically while light pipe 104 expands the pupil horizontally. Light pipe 104 can be disposed as a horizontal beam expander, and waveguide 106 can be disposed as a vertical beam expander and combiner in some embodiments. Light pipe 104 can be disposed as the vertical beam expander, and waveguide 106 can be disposed as the horizontal beam expander and combiner in some embodiments. In some embodiments, the display system 100 provides additional field of view by implementing additional layers of light pipe 104 and waveguide 106.

Projector 102 provides the image with a single color of light or multiple colors of light to light pipe 104. Projector 102 is a collimating projector, such as, a catadioptric collimating system. Projector 102 is comprised of multiple optical components integrated to provide a compact package in some embodiments. Projector 102 is physically attached to light pipe 104 and provides near collimated or collimated P-type or S-type polarized light in some embodiments. In some embodiments, an air gap exists between projector 102 and light pipe 104.

Light pipe 104 is a tube, waveguide or other optical assembly that allows light to travel from a first location to a second location in some embodiments. Light pipe 104 is an optical component that allows light to gradually leak into waveguide 106 as light travels within light pipe 104 in some embodiments. Advantageously, light pipe 104 does not add significant haze or grating losses to the image provided by display system 100 in some embodiments. Light pipe 104 captures the field of view in three dimensions and guides the field of view along the length of light pipe 104 in some embodiments.

In some embodiments, light pipe 104 is a waveguide embodied as an elongated rectangular prism with a square or rectangular cross sectional area. Light travels through light pipe 104 in a corkscrew, spiral, helical, or other fashion where all four sides of the rectangular prismatic shape are struck by light as light travels from a first end to a second end. In some embodiments, light pipe 104 is made from optical glass and includes a gradient reflection coating disposing an interface between light pipe 104 and waveguide 106. In some embodiments, the light travels by total internal reflection on three sides of light pipe 104 and by reflection off the gradient reflection coating on a fourth side.

In some embodiments, the gradient reflection coating is disposed directly on light pipe 104. Waveguide 106 receives light from the gradient reflective coating associated with light pipe 104. Light can be input to an edge of waveguide 106 and can be output via grating 108. Grating 108 can be a holographic grating, a volume grating, a surface relief grating, or other output coupler. Grating 108 can provide pupil expansion in a vertical direction while light pipe 104 provides pupil expansion in a horizontal direction. Other directions for pupil expansion are possible. Grating 108 can have a circular, oval, rectangular, or square shape.

Figure 2A:
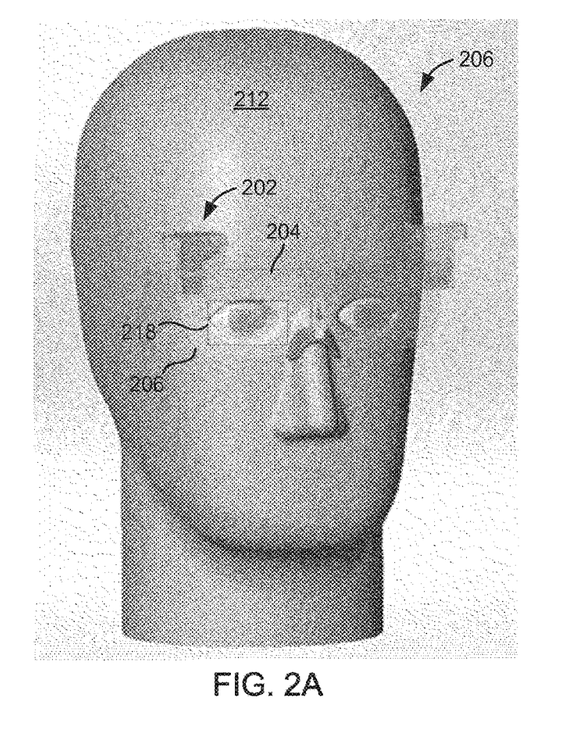
FIG. 2A is a perspective view schematic drawing of a display system worn by a user according to some exemplary embodiments.
Figure 2B:
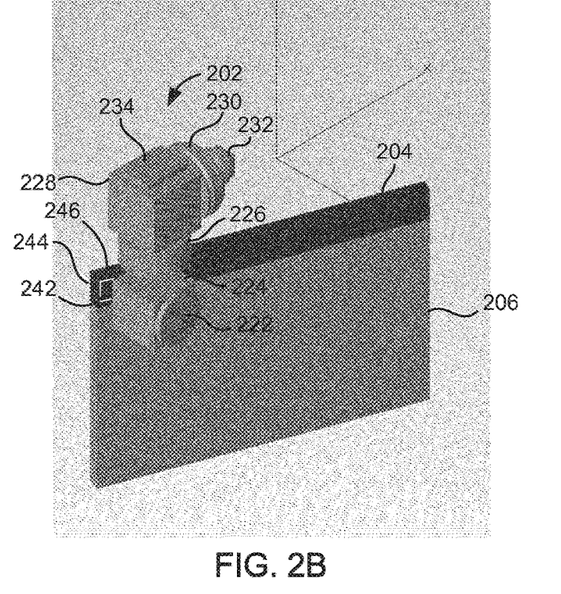
FIG. 2B is a more detailed perspective view schematic drawing of the display system illustrated in FIG. 2A without showing the user according to some exemplary embodiments.
Figure 2C:
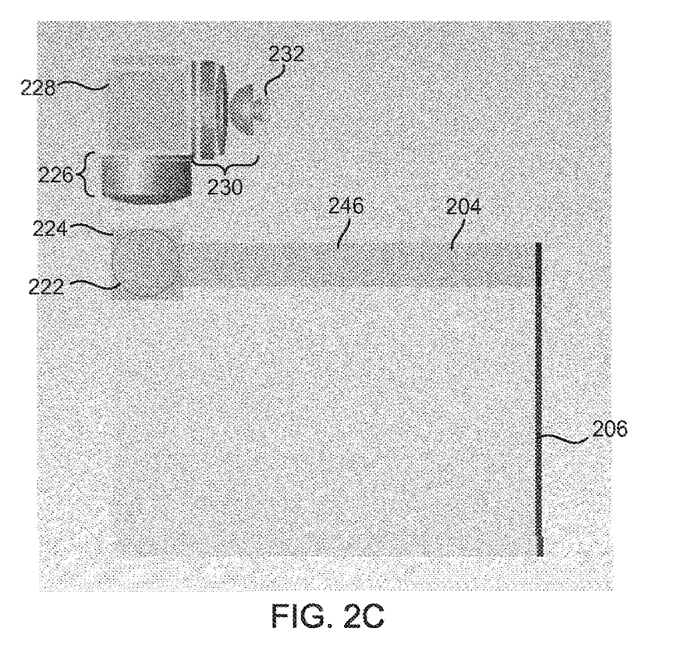
FIG. 2C is a planar front view schematic drawing of the display system illustrated in FIG. 2B according to some exemplary embodiments.

With reference to FIG. 2A-C, a display system 200 includes a projector 202, a light pipe 204 and a waveguide 206 and is similar to display system 100 discussed with reference to FIG. 1. Projector 202, light pipe 204 and waveguide 206 can be similar to projector 102, light pipe 104 and waveguide 106, respectively, described above with reference to FIG. 1. Projector 202 is disposed to be worn at approximately an eyebrow level associated with a user 212. User 212 views the environment through waveguide 206 operating as a combiner where light is ejected from a grating 218 of waveguide 206 into the eye of user 212 in some embodiments. Although a monocular display system 200 is described below, display system 200 can be a binocular system in some embodiments. Light pipe 204 is not required to be at a 90 degree angle with respect to waveguide 206 in some embodiments. Waveguide 206 can have a variety of shapes including an irregular shape with a flat interface facing a side of light pipe 204. Light pipe 204 can have a slanted orientation relative to the eye of the user in some embodiments.

With reference to FIGS. 2B-C, projector 202 is a low cost projector system in some embodiments. Projector 202 includes a mirror 222, beam splitter 224, a lens 226, a beam splitter 228, a lens 230, a light emitting diode source 232, and an image source 234. Projector 202 can be embodied as a catadioptric collimating system, such as a folded catadioptric projector.

Projector 202 can be implemented in any variety of fashions. Other projectors for some embodiments are discussed in U.S. application Ser. No. 13/251,087, U.S. patent application Ser. No. 13/250,940, U.S. patent application Ser. No. 13/250,858, U.S. patent application Ser. No. 13/250,970, U.S. patent application Ser. No. 13/250,994, and U.S. patent application Ser. No. 13/250,621. The components shown in FIGS. 2A-C are not shown in a limiting fashion.

Lens 226 and 230 can be an assembly of lenses and can include a field flattening lens, collimating lenses, etc. Mirror 222 can be a powered, collimating mirror in some embodiments. Laser source 232 is a laser diode or other device for providing laser light at a single wavelength through lens 230 in some embodiments. Laser source 232 can include a board for a light emitting diode (LED). Beam splitter 228 reflects the light from lens 230 to image source 234. Lens 230 can include a convex or spherical lens, polarizing film, retarder films, etc. Beam splitter 228 is a polarizing beam splitter in some embodiments. An image from image source 234 is provided through beam splitter 228 to lens 226 in some embodiments. Lens 226 can include a convex lens, a polarizing film, and/or a retarder film in some embodiments. Image source 234 is a liquid crystal display (LCD) or other image source in some embodiments.

Light received by lens 226 is provided to beam splitter 224. Beam splitter 224 can be a polarizing beam splitter. Beam splitter provides the light from lens 226 to mirror 222. Mirror 222 provides the light through beam splitter 224 to light pipe 204 in some embodiments. In some embodiments, beam splitter 224 and mirror 222 are provided as an integrated package attached to light pipe 204 and physically separate from lens 226.

Light pipe 204 includes an input coupler or input grating 242. Input grating 242 injects light from beam splitter 224 into light pipe 204. Light pipe 204 guides light to waveguide 206 which is ejected into the eye via grating 218. Input grating 242 is a reflection type grating disposed on an opposite side 244 of light pipe from a side 246 closest to beam splitter 224 in some embodiments. In some embodiments, input grating 242 is a transmission type grating on side 244 or embedded within light pipe 204. In some embodiments, display system 200 is compatible with dispersion compensation which allows use of LED and reduces the banding effect typically associated with lasers. For dispersion compensation, the input and output gratings are "matched" (e.g., grating line orientations are either parallel to each other or mirror symmetric to each other (with respect to the interface facet), and that their surface pitches are identical) in some embodiments.

In some embodiments, light pipe 204 injects light into waveguide 206 along its top edge. Alternatively, light can be ejected into an outside or inside main surface of waveguide 206. In one embodiment, light pipe 204 has a cross sectional area of five millimeters by five millimeters and a length of approximately 25 millimeters. In one embodiment, waveguide 206 touches light pipe 204 such that total internal reflection does not occur on the bottom surface of light pipe 204.

Figure 3:
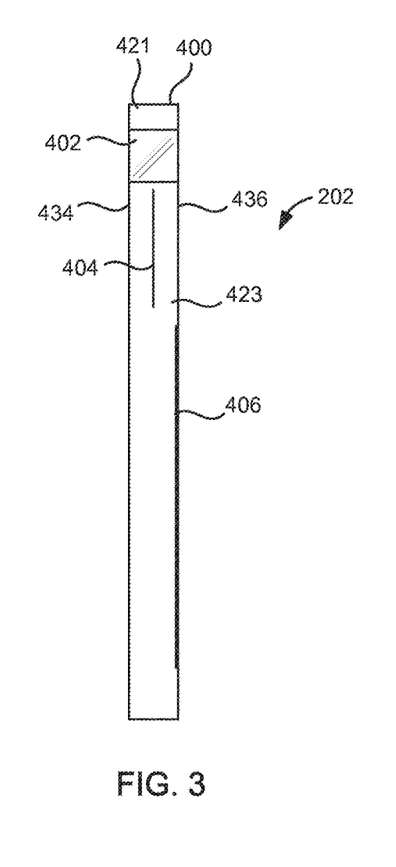
FIG. 3 is planar side view schematic drawing of a light pipe for the display system illustrated in FIG. 2A according to some exemplary embodiments.
Figure 4:
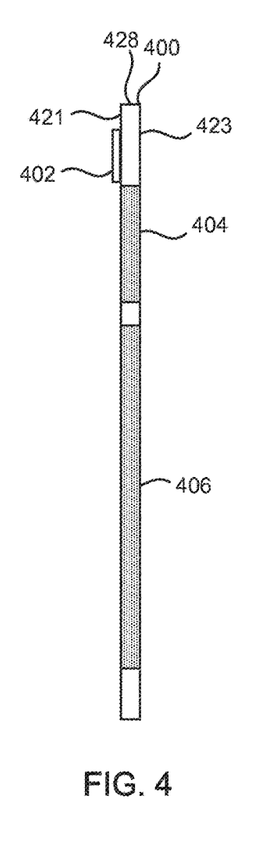
FIG. 4 is a planar top view schematic drawing of the light pipe illustrated in FIG. 3 according to some exemplary embodiments.

With reference to FIGS. 3 and 4, a light pipe 400 can be utilized as light pipe 104 or 204 described above with reference to FIGS. 1 and 2A-C. Light pipe 400 includes an input grating 402, a beam splitting coating 404, and an output coupler or a gradient reflection coating 406. Input grating 402 can be provided on a first side 421 of light pipe 400. First side 421 can correspond to a side closest to the user's eye in some embodiments. Alternatively, input grating 402 can be provided on a side 423 away from the user's eye.

Input grating 402 can be integral with light pipe 400 or can be externally attached to light pipe 400. In some embodiments, input grating 402 is a surface relief grating having a period of approximately 400 to 450 nanometers. Input grating 402 can be rotated to various orientations depending upon system criteria and design parameters. Although shown at a first end 428 on a surface 421, input grating 402 can be placed along any external surface of or within light pipe 400 at various locations. Input grating 402 can be a holographic grating, a volume grating, a surface relief grating, or other input coupler. Input grating 402 can be embedded, or embossed in some embodiments.

In some embodiments, light pipe 400 is optical glass (e.g., fused silica), plastic, or other material for transporting light. In some embodiments, light pipe 400 has neighboring sides at 90 degree angles with respect to each other (e.g., square or rectangular in cross section). The end of light pipe 400 can be coated with an absorptive material to reduce stray light in some embodiments. Beam splitting coating 404 can be disposed in a middle of light pipe 400. In one embodiment, light pipe 400 includes two plates with beam splitting coating 404 disposed between the two plates. Beam splitting coating 404 is parallel to a surface 434 and a surface 436. Beam splitting coating 404 advantageously increases the number of rays propagating from input coupler 402 to reflection coating 406. Beam splitting coating 404 fills in, bounces, and blends the image for uniformity in some embodiments. Beam splitting coating 404 can be manufactured from a metallic or dichroic optical coating.

Gradient reflection coating 406 can be a dichroic coating or a silver coating covering surface 436 that gradually leaks light from light pipe 400 into waveguide 106 or 206. Gradient reflection coating 406 is disposed on surface of waveguide 106 or 206 associated with surface 436 in some embodiments. Gradient reflection coating 406 provides very low haze and does not require a grating for ejection of light. Gradient reflection coating 406 is configured to leak light from light pipe 400 to waveguide 106 or 206 such that the light is received with relative uniformity and the pupil is expanded in some embodiments. In some embodiments, gradient reflection coating 406 is non-gradient reflection coating (e.g, a uniform reflection coating).

Figure 5:
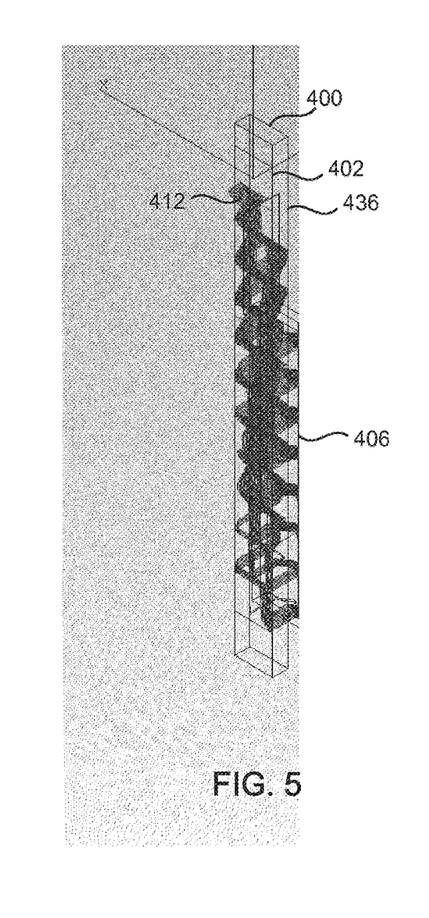
FIG. 5 is a perspective view schematic drawing of the of the light pipe illustrated in FIG. 3 according to some exemplary embodiments.

With reference to FIG. 5, light 412 entering light pipe 400 is diffracted along a light path by input coupler 402 to travel along light pipe 400. Light striking gradient reflection coating leaves light pipe 400. In one embodiment, gradient reflection coating 406 is configured to leak about 15% of light into waveguide 106 or 206 embodied as a vertical beam expander at an upper portion and gradually leaks a higher percentage (up to 50%) producing uniform light output. Absorption by coating 406 is preferably relatively low (e.g. less than 3%).

Figure 6:
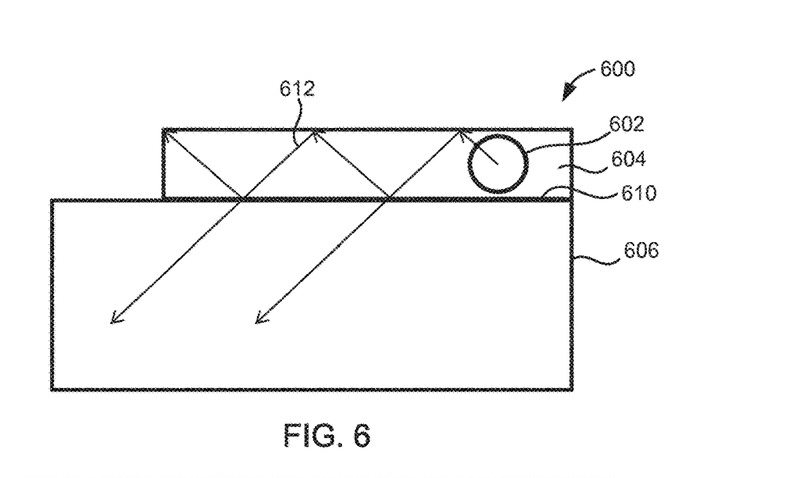
FIG. 6 is planar front view schematic drawing of the light pipe and the waveguide for the display system illustrated in FIG. 2 according to some exemplary embodiments.

With reference to FIG. 6, a light pipe 604 includes an input grating 602 and is attached to waveguide 606. Light pipe 604 and waveguide 606 can be similar to light pipes 400, 204 and 104 and waveguides 206 and 106, respectively. A gradient reflection coating 610 is disposed in an interface between light pipe 604 and waveguide 606. Light 612 travels through light pipe 604 and is gradually released into waveguide 606. In some embodiments, gradient reflection coating 610 is a half silver coating of variable thickness. Gradient reflection coating 610 can be monochromatic or polychromatic. In some embodiments, the facet of light pipe 604 opposite to gradient interface coating 610 (the interface facet to waveguide 606) can be mirror-coated to reflect light even beyond a total internal reflection condition to increase field of view.

Figure 7:
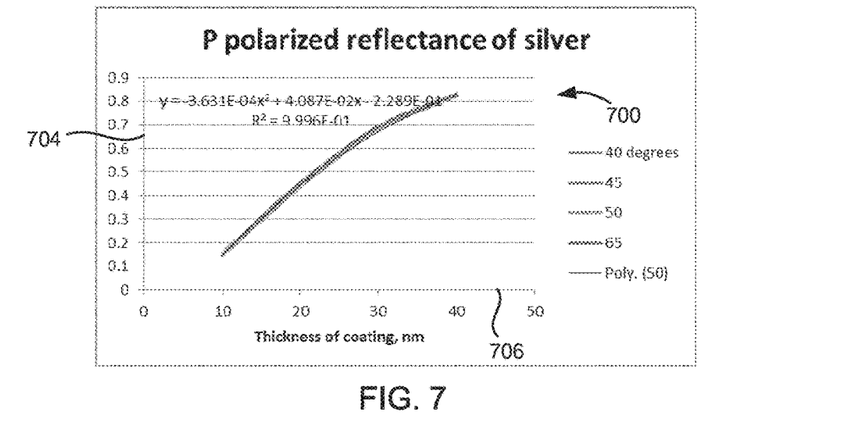
FIG. 7 is a graph showing reflectance versus thickness at a number of angles for a gradient reflection coating associated with the light pipe illustrated in FIG. 3 according to some exemplary embodiments.

With reference to FIG. 7, reflectance of p-polarized light is shown in a graph 700. Graph 700 includes a Y axis 904 showing reflectance in percentage and an X axis 706 showing thickness of the coating in nanometers. Graph 700 shows a number of lines indicating reflectance at particular angles from 40 to 65 degrees. As shown, reflectance is relatively uniform for a silver coating across varying angles. Accordingly, by controlling the thickness of gradient reflection coating 610, an appropriate light output can be provided in some embodiments.

Figure 8:
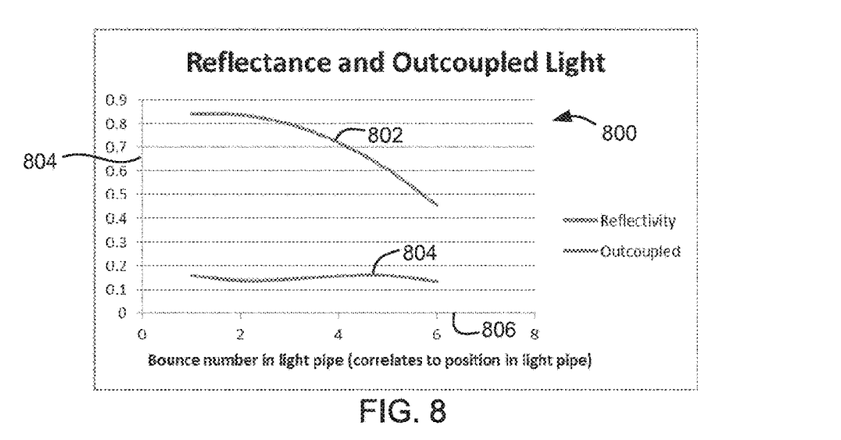
FIG. 8 is a graph showing reflectance and light output versus number of bounces for a gradient reflection coating associated with the light pipe illustrated in FIG. 3 according to some exemplary embodiments.

With reference to FIG. 8, a graph 800 shows reflectivity in percentage on Y axis 804 and the number of bounces in light pipe 604 on an X axis 806. As shown in FIG. 8, the thickness of gradient reflective coating 610 can be chosen according to line 804 to provide a uniform output according to line 802 in some embodiments. The number of bounces in light pipe 604 is correlated to a position in light pipe 604 along its elongated surface.

Figure 9:
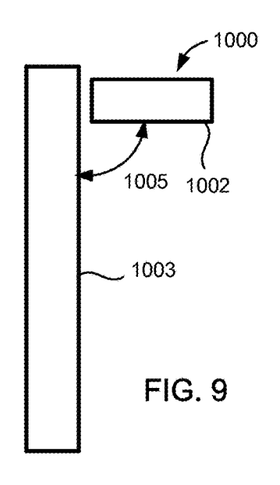
FIG. 9 is a planar side view schematic drawing of a projector and a light pipe and waveguide assembly at a first orientation for the display system illustrated in FIG. 1 according to some exemplary embodiments.
Figure 10:
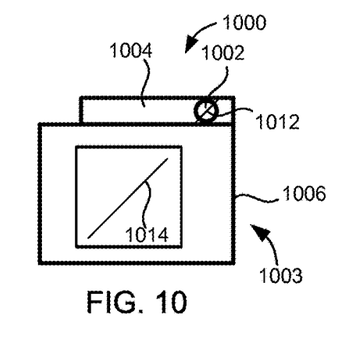
FIG. 10 is a planar back view schematic drawing of the projector and the light pipe and waveguide assembly at the first orientation illustrated in FIG. 9 according to some exemplary embodiments.

With reference to FIGS. 9 and 10, a light pipe and waveguide assembly 1003 is disposed at a right angle 1005 with respect to projector 1002 for display system 1000. Light pipe and waveguide assembly 1003 includes light pipe 1004 and waveguide 1006 in some embodiments. Grating 1012 of light pipe 1004 and grating 1014 of waveguide 1006 are disposed compensate for angle 1005 in some embodiments. In some embodiments, the angles of orientation of gratings 1012 and 1014 match.

Figure 11:
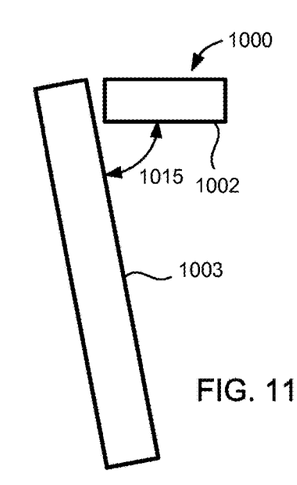
FIG. 11 is a planar side view schematic drawing of a projector and a light pipe and waveguide assembly at a second orientation for the display system illustrated in FIG. 1 according to some exemplary embodiments.
Figure 12:
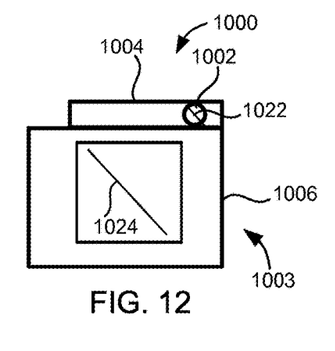
FIG. 12 is a planar back view schematic drawing of the projector and the light pipe and waveguide assembly at the second orientation illustrated in FIG. 11 according to some exemplary embodiments.
Figure 13:
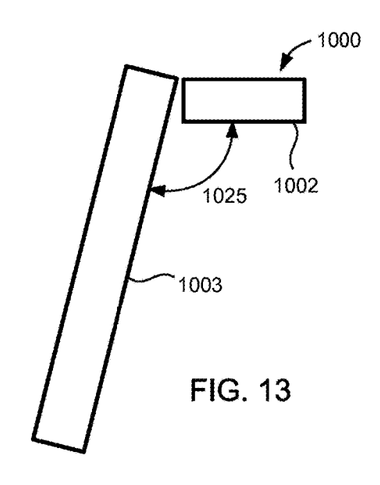
FIG. 13 is a planar side view schematic drawing of a projector and a light pipe and waveguide assembly at a third orientation for the display system illustrated in FIG. 1 according to some exemplary embodiments.
Figure 14:
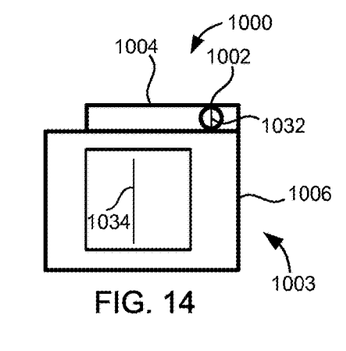
FIG. 14 is a planar side back schematic drawing of the projector and the light pipe and waveguide assembly at the third orientation illustrated in FIG. 13 according to some exemplary embodiments.

With reference to FIGS. 11 and 12, light pipe and waveguide assembly 1005 is disposed at an acute angle 1015 with respect to projector 1002 for display system 1000. Gratings 1022 and 1024 are oriented to compensate for angle 1015. Gratings 1022 and 1024 can be disposed at a similar angle. In some embodiments, the angles of orientation of gratings 1022 and 1024 match With reference to FIGS. 13 and 14, light pipe and waveguide assembly 1003 is disposed at an obtuse angle 1025 with respect to projector 1002 for display system 1000. Grating 1032 in light pipe 1004 and grating 1034 in waveguide 1006 are disposed to compensate for angle 1025 in some embodiments. In some embodiments, the angles of orientation of gratings 1032 and 1034 match. Angles 1005, 1015 and 1025 can be used to provide a more compact design.

Different configurations of light pipes 104, 204 and waveguides 106 and 206 are possible. Although edge coupled structures are shown, other arrangements are possible. In some embodiments, the configurations are used in a sand wind and dust goggle or a frame for glasses. In some embodiments, the output gratings are displaced so that they line up with the eye location in the goggle or the frame. In some embodiments, a display system uses more than one light pipe and waveguide to increase the field of view. Such a display system can use a projector designed to output a higher field of view than a projector for single light pipe waveguide projectors (given its numerical aperture) in some embodiments.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure.

What is claimed is:

1. A near eye optical display, comprising:
   a light pipe comprising a plurality of elongated surfaces and an input coupler, the light pipe being configured to provide an image received by the input coupler and expand the image in a first direction through one of the elongated surfaces, wherein light associated with the image travels through the light pipe by striking three or more of the elongated surfaces; and
   a waveguide comprising an output grating, a first surface, a second surface, and a side surface, the first surface and the second surface having a larger area than the side surface, the output grating being configured to provide the image expanded in a second direction, the second direction being different than the first direction, wherein the image enters the waveguide from the one of the elongated surfaces at the side surface, wherein the three or more elongated surfaces comprise at least a third surface, a fourth surface and a fifth surface, the third surface and the fourth surface being parallel and the fifth surface being non-parallel to the third surface and the fourth surface and connecting the fourth surface to the third surface.

2. The near eye optical display of claim 1, wherein the first direction is orthogonal to the second direction.

3. The near eye optical display of claim 1, wherein the one elongated surface, the side surface, the first surface and the second surface are planar surfaces.

4. The near eye optical display of claim 1, further comprising:
   a collimating lens system for providing light from a display source to the input coupler, the collimating lens system being a catadioptric system.

5. The near eye optical display of claim 1, further comprising:
   a gradient reflective coating disposed on the one elongated surface.

6. The near eye optical display of claim 5, further comprising a beam splitting coating between the input coupler and the gradient reflective coating.

7. The near eye optical display of claim 1, wherein the input coupler is a volume hologram or a surface relief grating.

8. The near eye optical display of claim 1, wherein the first direction is horizontal and the second direction is vertical.

9. The near eye optical display of claim 1, wherein gratings associated with the input coupler are parallel to the output grating and wherein the output grating is not parallel to the side surface.

10. The near eye optical display of claim 1, wherein the output grating is disposed in a relationship to an angle of the waveguide with respect to the light pipe.

11. A method of displaying information, the method comprising:
   receiving light in a light pipe having a surface with a non-gradient or gradient reflection coating and at least three elongated surfaces, the light striking the at least three elongated surfaces and traveling at least partially by total internal reflection within the light pipe;
   receiving the light from the surface with the non-gradient or gradient reflective coating in a waveguide having a first surface and a second surface;
   providing the light to an output grating via total internal reflection between the first surface and the second surface,
   providing the light from the waveguide via the output grating, where the light is provided with dual axis pupil expansion with respect to the light received in the light pipe.

12. The method of claim 11, wherein the output grating is a volume hologram or surface relief grating.

13. The method of claim 11, further comprising beam splitting the light received in the light pipe before the light enters the waveguide.

14. The method of claim 11, wherein the light pipe includes an input coupler.

15. The method of claim 14, wherein the input coupler is a surface relief grating.

16. An apparatus for providing an image, the apparatus comprising:
   a light pipe comprising a non-gradient or gradient reflective coating and at least four elongated surfaces, each elongated surface connecting to at least two other of the elongated surfaces, the non-gradient or gradient reflective coating is disposed on one of the at least four elongated surfaces and light associated with the image strikes at least three of the at least four elongated surfaces as the light travels in a corkscrew or helical fashion within the light pipe; and a waveguide comprising an input surface and an output surface, the input surface being non-planar with respect to the output surface, wherein the light from the non-gradient or gradient reflective coating is received at the input surface and the light is ejected from the output surface of the waveguide by an output grating.

17. The apparatus of claim 16, wherein the apparatus provides dual axis pupil expansion.

18. The apparatus of claim 16, wherein the light pipe comprises an input grating.

19. The apparatus of claim 16, further comprising a first beam splitting coating disposed in the waveguide and a second beam splitting coating disposed in the light pipe.

20. The apparatus of claim 16, wherein the light pipe has a rectangular prismatic shape.

\* \* \* \* \*